Oct. 29, 1935.  T. S. BACON  2,019,468
PROCESS FOR PURIFYING GAS
Filed Jan. 25, 1933
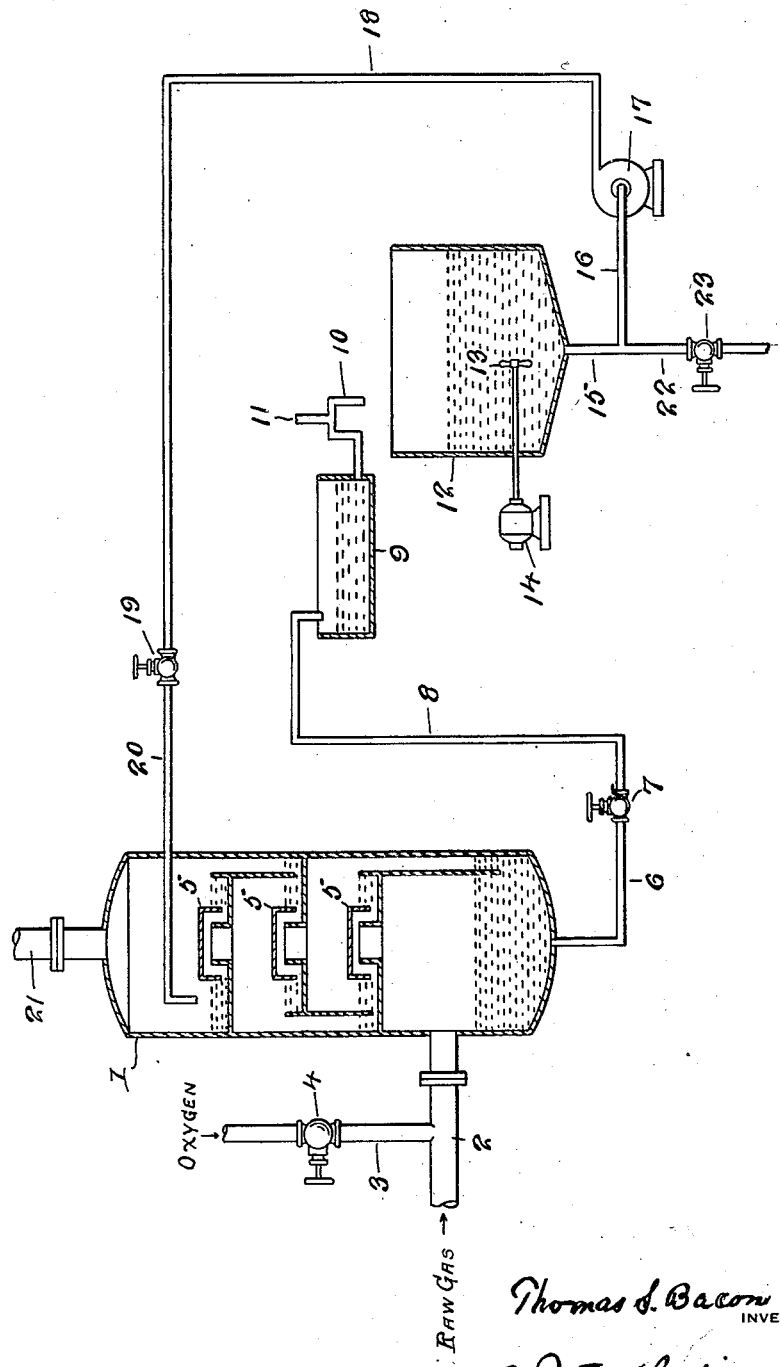
Thomas S. Bacon
INVENTOR
By Foster & Cordier
ATTORNEYS Patented Oct. 29, 1935

2,019,468

UNITED STATES PATENT OFFICE 2,019,468

PROCESS FOR PURIFYING GAS

Thomas S. Bacon, Dallas, Tex., assignor to Lone Star Gas Company, Dallas, Tex., a corporation of Texas Application January 25, 1933, Serial No. 653,553

7 Claims. (Cl. 23—3)

The present invention relates to a process of removing hydrogen sulphide from gases.

Among the objects of the invention is to provide a process especially useful for purifying gases containing small amounts of hydrogen sulphide, whereby the small amounts of hydrogen sulphide are effectively removed from the gases and the treated gases rendered substantially free of hydrogen sulphide. The present process may be successfully applied to the removal of hydrogen sulphide in gases containing less than 100 grains of hydrogen sulphide per 100 cubic feet of gas.

A further object of the present invention is to provide a process particularly suitable for removing hydrogen sulphide, mercaptans and related sulphur compounds from hydrocarbon gases, for example natural gas, or other hydrocarbon gases, in which the sulphur content is very low. Ordinarily hydrocarbon and other gases containing hydrogen sulphide, mercaptans or related compounds of sulphur in small concentrations are not readily treated to reduce the hydrogen sulphide and sulphur content. The present invention affords a means for effectively treating and substantially completely removing these sulphur containing bodies from such gases.

The invention may be applied to removing hydrogen sulphide from gases containing less than 100 grains of hydrogen sulphide per 100 cubic feet of gas; and I have found that it may even be applied to treating gases containing as low as one-half to three grains of hydrogen sulphide per 100 cubic feet of gas and the hydrogen sulphide content reduced to less than one-half of one grain of hydrogen sulphide per 100 cubic feet of gas treated, and that it is possible to reduce the hydrogen sulphide content of the treated gas to one-tenth of one grain of hydrogen sulphide per 100 cubic feet of gas, and even less than this.

Among other objects of the invention is the provision of a process for removing hydrogen sulphide from gases containing low concentrations of hydrogen sulphide of the order of magnitude indicated above which may be practiced in simple and relatively inexpensive apparatus and wherein the circulation and handling of large volumes of treating solutions or liquors is avoided or rendered unnecessary, or reduced very considerably.

A further object of the present invention is to prevent or greatly reduce corrosion of iron, steel or other metal pipes used for conducting, under superatmospheric pressure, natural gas or other fuel, heating or illuminating gas. If these gases contain even small amounts of hydrogen sulphide, even as low as one-half to three grains of hydrogen sulphide per 100 cubic feet of gas, marked and detrimental corrosion of the metal of the pipes occurs when the gases are conveyed through the pipes at superatmospheric pressures in excess of 60 pounds per square inch absolute, particularly when said gases contain small amounts of free oxygen. Heretofore the removal or reduction of these small amounts of hydrogen sulphide on a commercial scale has been attained with difficulty, if at all. However, when such gases containing the said low concentrations of hydrogen sulphide are treated in accordance with the process of the present invention, the hydrogen sulphide content may be greatly reduced or substantially completely removed, whereby the aforementioned corrosion is eliminated or reduced to a great extent.

A still further object of the invention is the provision of a process particularly suited for substantially completely removing hydrogen sulphide and related sulphur compounds from gases intended for use in catalytic processes, for example the removal of small amounts of hydrogen sulphide from hydrogen intended for use in catalytic hydrogenation processes.

In describing the invention and process in further detail below, reference is made to the accompanying drawing showing apparatus suitable for practicing the invention and process, and to natural gas containing hydrogen sulphide in small concentration; although it is to be understood that the practice of the invention or the process is neither limited to the apparatus shown and described nor to the purification of natural gas, reference being made to the apparatus shown and to natural gas for the purposes of illustration only. The process of the present invention may be practiced in apparatus other than particularly shown and described herein, and the process may be applied to treating gases other than natural gases, for example hydrogen, coke oven gases, etc., but I have found the present invention particularly useful in treating natural gases under high pressure and containing only very small amounts of hydrogen sulphide, particularly gases containing less than 100 grains of hydrogen sulphide per 100 cubic feet of natural gas.

Referring to the drawing forming part of this description, the numeral 1 indicates a gas scrubber adapted to contain the reagents hereinafter more particularly described. The scrubber 1 advantageously may be an ordinary bubble tower having bubble trays, plates or compartments or a tower filled with inert contact bodies. The numeral 2 indicates a pipe for conducting the gases to be purified to the lower portion of the scrubber 1. The numeral 3 indicates a pipe connecting with the pipe 2 for introducing, when necessary oxygen or atmospheric air into the gases proceeding into the scrubber 1. The numeral 4 indicates a valve for controlling the amount of air or oxygen introduced into the gases.

As an example of a gas to which the invention has been successfully applied may be mentioned a natural gas obtained from wells operated under vacuum, the pressure of said gases being stepped up by compression to 85 to 125 pounds per square inch absolute pressure prior to treatment according to the present invention, the said gas containing prior to treatment and after compression a hydrogen sulphide concentration ranging from one-half to three grains of hydrogen sulphide per 100 cubic feet of gas, a small amount of oxygen, a small amount of carbon dioxide and the hydrocarbons usually found in natural gas in the Texas fields. This gas under the pressure of 85 to 125 pounds per square inch absolute passes through the pipe 2 and enters the scrubber 1, ascends through the scrubber 1, and the gas, substantially free of hydrogen sulphide, and still under pressure, preferably undiminished, passes out of the scrubber 1 by means of the pipe 21 which leads to the pipe lines for transporting the purified gas under pressure or to compressors for further compressing the purified gas.

In the scrubber 1 is placed a solution of an alkali, such as sodium hydroxide, sodium carbonate, sodium acid carbonate, potassium hydroxide, potassium carbonate or potassium acid carbonate, or mixtures of these and to which solution is added a water solution of a soluble salt of manganese, nickel, cobalt or iron, or preferably a water solution of a mixture of zinc and iron salts. As suitable salts are mentioned ferrous or ferric chloride, ferrous or ferric sulphate, nickelous or nickelic sulphate or nitrate, cobaltous or cobaltic chloride and manganous or manganic chloride or sulphate. A mixture of iron and zinc salts gives greatly improved results over iron salts alone. The presence of zinc compounds in admixture with the iron compounds greatly increases the efficiency of removal of hydrogen sulphide according to the present invention. In utilizing a mixture of iron and zinc salts, preferably equal molecular quantities of a soluble iron salt above mentioned and of a soluble zinc salt (for example, zinc sulphate, zinc chloride, zinc nitrate, etc.) are dissolved in a small volume of water and this solution of the two salts is then added to the alkali solution prior to exposing the alkali solution to hydrogen sulphide. The resulting mixture is then preferably agitated for a short period of time, for example one hour or more, before being contacted with gases containing hydrogen sulphide. If the zinc and iron salt solutions are added to the alkali solution independently of each other, or their mixture added to the alkali solution after it has been contacted with hydrogen sulphide to any appreciable extent, the desired influence of the mixture does not appear to develop or develops incompletely. Agitating or mixing the alkali and added zinc and iron salts before use, as described above, increases the activity of the mixture, the alkali content of the solution should be more than sufficient to react with the salts added so that after the addition of the salts the solution is still alkaline.

In the specific example under consideration, the water solution of alkali employed in the scrubber 1 may have an initial concentration of alkali, after the aforementioned salts are added, of as low as about one-half of one per cent (calculated as sodium carbonate) of the weight of the total solution, but the concentration of alkali may greatly exceed this value, for example it may be from 1 to 5 per cent or more. The amount of the salts or mixture of salts added to the water solution of the alkali may also vary within relatively wide limits. For example the amount of metal combined in the salts added to the alkali solution may be as high as 4 per cent or even more of the total weight of the alkali solution, or may be as low as 0.2 per cent in the case of the mixture of iron and zinc salts or as low as .01 per cent in the case of nickel and cobalt salts.

When the water solution of metal salts is added to the alkali solution, hydroxides or carbonates or other oxygen containing compounds of the metals are formed in the alkali solution, and it will be observed the scrubber 1 will contain an alkaline solution having in suspension hydroxides, or oxides, or carbonates or other oxygen containing compounds of the metals. Hereinafter and in the claims the suspended matter in these suspensions is referred to as "metal hydroxides" or "hydroxides of metals".

The natural gas containing the very small amounts of hydrogen sulphide indicated and also the small proportion of oxygen comes in intimate contact with the suspension in scrubber 1, the purified gas, substantially free of hydrogen sulphide, passing out under pressure from the scrubber 1 by means of the pipe 21. Contacting the suspension with the natural gas containing hydrogen sulphide and oxygen results not only in the substantially complete removal of hydrogen sulphide from the gas, but such removal is accompanied by the liberation of free or elemental sulphur in the suspension and the maintenance of the purifying activity or purifying capacity of the suspension. If the gas does not contain oxygen, or insufficient quantities of oxygen to accomplish complete purification are present, oxygen or atmospheric air may be added to the gas to bring about complete purification. This oxygen or air may be introduced into the gas, in the apparatus shown in the drawing, by means of the pipe 3 which leads into the pipe 2 carrying the gases to the scrubber 1. Thus, the purifying of the gas and the regeneration or maintenance of the activity of the suspension is accomplished at one and the same time, that is simultaneously. This fact is extremely important in the treatment of gases having very small contents of hydrogen sulphide, since the simultaneous or immediate regeneration of the treating medium results in a liquid medium in the scrubber 1 which manifests an exceedingly small, or practically zero, partial pressure of hydrogen sulphide above its surface even in the presence of carbon dioxide. As the extent of purification which is capable of being accomplished by a liquid medium will be more or less limited to the partial pressure of hydrogen sulphide above its surface, produced by hydrogen sulphide in solution or in hydrolyzable combination, it will be at once apparent that substantially complete removal of hydrogen sulphide can be obtained from a gas containing only very small proportions of hydrogen sulphide when the process of the present invention is employed.

For substantially complete removal of the small quantities of hydrogen sulphide from the gas, the oxygen or air must also be under pressure when the gases are passed through the scrubber 1. In the event that the gas to be purified does not already contain oxygen, or does contain insufficient oxygen, then oxygen or air under pressure must be added to the gas undergoing purification. Maintaining the oxygen or air under pressure in admixture with the gases to be purified, also under pressure, enables the hydrogen sulphide to be decomposed with the liberation of sulphur very rapidly and without the necessity of employing large excesses of air or oxygen, whereby contamination of the purified gas with oxygen, or excesses of nitrogen when using air, is avoided.

The alkaline scrubbing suspension is normally prepared in tank 12, fitted with an agitator 13, driven by motor 14, the agitator serving to keep the precipitated compounds in suspension in the scrubbing liquor. The scrubbing liquor leaves tank 12 through pipe 15, and may pass through pipe 16 to pump 17. Pump 17 discharges the scrubbing liquor into the top of scrubber 1 through pipe 18, valve 19 and pipe 20. The scrubbing liquor removes the impurities from the gas as the gas and liquor pass countercurrent through the scrubber 1. The scrubbing liquor passes downwardly through the plates 5 and collects in the base of the scrubber 1. The scrubbing liquor is removed from the bottom of the scrubber 1 through pipe 6, passes through valve 7 and pipe 8 to the box 9. The rate of flow of the scrubbing liquor from the scrubber 1 is controlled by valve 7 so that the level of the scrubbing liquor in the base of scrubber 1 is maintained above the top of pipe 6 and below the bottom of pipe 2. In box 9, the gas dissolved in the scrubbing liquor under the conditions of pressure that exist in scrubber 1 leaves the solution in the form of fine bubbles. These bubbles serve to bring small particles of free sulphur to the surface of the liquor in box 9 and the free sulphur may be removed from the liquor in box 9. The scrubbing liquor, substantially freed of free sulphur, leaves box 9 through pipe 10, fitted with a gooseneck and vent 11 to maintain the proper level of liquor in box 9. Tank 12 is provided with a drain 22 that is normally closed by valve 23.

The process may be practiced without circulating the scrubbing liquor through the scrubber 1. This may be accomplished by filling the scrubber 1 about half full of scrubbing liquor with valve 7 closed, and then stopping pump 17 and closing valve 19. The gases under pressure enter the scrubber 2 as before. However, by this method of operating, the free sulphur formed in the scrubbing solution is not removed from the solution, but remains partly suspended in the solution and partly deposited on the internal surfaces of the scrubber 1. It has been found that the circulation of only a small volume of scrubbing liquor will substantially eliminate deposition of sulphur on the internal surfaces of the scrubber 1, and consequently, as heretofore described, it is preferred to circulate a small volume of liquor to materially lessen the frequency with which sulphur must be removed from the internal surfaces of the scrubber 1.

Various factors affect the completeness of removal of hydrogen sulphide from the gas. Among the important factors may be mentioned the alkalinity of the scrubbing solution, the nature of the metal compounds added to the scrubbing solution, the temperature of the gas, the pressure of the gas, the concentration of free oxygen in the gas, initial concentration of the hydrogen sulphide in the gas, and the time of contact of the gas with the scrubbing liquor. The concentration of the alkali in solution for best results should be in excess of one-half of one per cent of the weight of the total solution and may be as high as ten per cent of the weight of the solution. Generally speaking the rate and completeness of removal of hydrogen sulphide and similar bodies from the gas increases with increase in temperature and pressure. The scrubbing efficiency will also increase with increase in free oxygen concentration in the gas. I have found that the partial pressure of the oxygen in the gas to be treated need not be in excess of 0.5 pounds per square inch to give satisfactory scrubbing of gases containing low concentrations of hydrogen sulphide of the order of magnitude of one-half to three grains of hydrogen sulphide per 100 cubic feet of gas. The time of contact of the gas with the scrubbing liquor is preferably regulated by controlling the total depth of liquid through which the gas must pass. In the treatment of natural gas specifically described above in connection with the drawing, the total depth of the liquor on the plates 5 in the scrubber 1 may advantageously be one or two, or more feet, when the mixture of iron and zinc salts is employed.

Other impurities besides hydrogen sulphide may be present in the gas without harmful influence upon the operation. For example carbon dioxide may also be an impurity in the gas. After prolonged use of the scrubbing liquor, it may be found advantageous to add additional alkali and/or additional metal compounds, or to completely replace the scrubbing liquor after prolonged use.

The term superatmospheric pressure as used in the written description and claims is used in the sense of including the pressures specifically mentioned and other pressures considerably in excess of atmospheric pressure.

Having described my invention, I claim:

1. The process of purifying a gas which contains hydrogen sulphide as an impurity which comprises contacting said gas under superatmospheric pressure in the presence of oxygen with an alkali solution containing a complex of compounds of metals formed by mixing a solution of a mixture of zinc and iron salts with an aqueous alkali solution.

2. The process of purifying a gas which contains oxygen and which also contains hydrogen sulphide as an impurity which comprises contacting said gas under superatmospheric pressure with an alkali solution containing the metal hydroxides, iron and zinc hydroxides.

3. The process of purifying a gas containing hydrogen sulphide as an impurity which comprises bringing said gas under superatmospheric pressure in the presence of oxygen in contact with an aqueous alkaline solution containing oxygen containing compounds of zinc and iron.

4. The process of purifying a gas which contains hydrogen sulphide as an impurity which comprises contacting said gas under superatmospheric pressure in the presence of oxygen with an aqueous alkaline solution containing a composition including iron and zinc obtained by adding a solution containing iron and zinc salts to an alkali solution and contacting hydrogen sulphide therewith in the presence of oxygen.

5. The process of preparing a purifying agent for gases which comprises mixing a solution containing zinc and iron compounds with an alkali solution.

6. An agent for purifying gases, an aqueous solution of alkali to which has been added a solution containing iron and zinc salts.

7. An agent for purifying gases consisting of the iron-zinc complex formed by mixing a solution containing iron and zinc salts with a solution containing an alkali.

THOMAS S. BACON.